United States Patent [19]
Yonezawa

[11] 3,981,328
[45] Sept. 21, 1976

[54] HAND-OPERABLE TAKEOUT VALVE FOR A FLUID PRESSURIZED CONTAINER

[75] Inventor: Keitaro Yonezawa, Kobe, Japan

[73] Assignee: Kabushiki Kaisha Neriki, Japan

[22] Filed: July 24, 1975

[21] Appl. No.: 598,733

[30] Foreign Application Priority Data
Aug. 9, 1974 Japan.................................. 49-91851

[52] U.S. Cl............................. 137/614.2; 137/523;
137/637.4; 251/83; 251/266
[51] Int. Cl.²........................................ F16K 11/18
[58] Field of Search............... 137/522, 523, 614.2,
137/614.21, 637.3, 637.4; 251/82, 83, 266

[56] References Cited
UNITED STATES PATENTS

| | | |
|---|---|---|
| 2,861,569 | 11/1958 | Emerson........................... 251/83 X |
| 2,874,719 | 2/1959 | Van Tuyl..................... 137/614.2 X |
| 2,924,421 | 2/1960 | Pohndorf......................... 251/266 X |
| 3,292,895 | 12/1966 | Leger et al............................. 251/83 |
| 3,485,371 | 12/1969 | Costantini................... 137/614.2 X |

*Primary Examiner*—Henry T. Klinksiek
*Attorney, Agent, or Firm*—Bacon & Thomas

[57] ABSTRACT

A hand-operable takeout valve for temporary attachment to a fluid pressurized container, including a hand-operable main valve and a check valve operable in response to a fluid pressure, wherein the check valve is additionally controllable by hand for co-working with the operation of the main valve.

28 Claims, 24 Drawing Figures

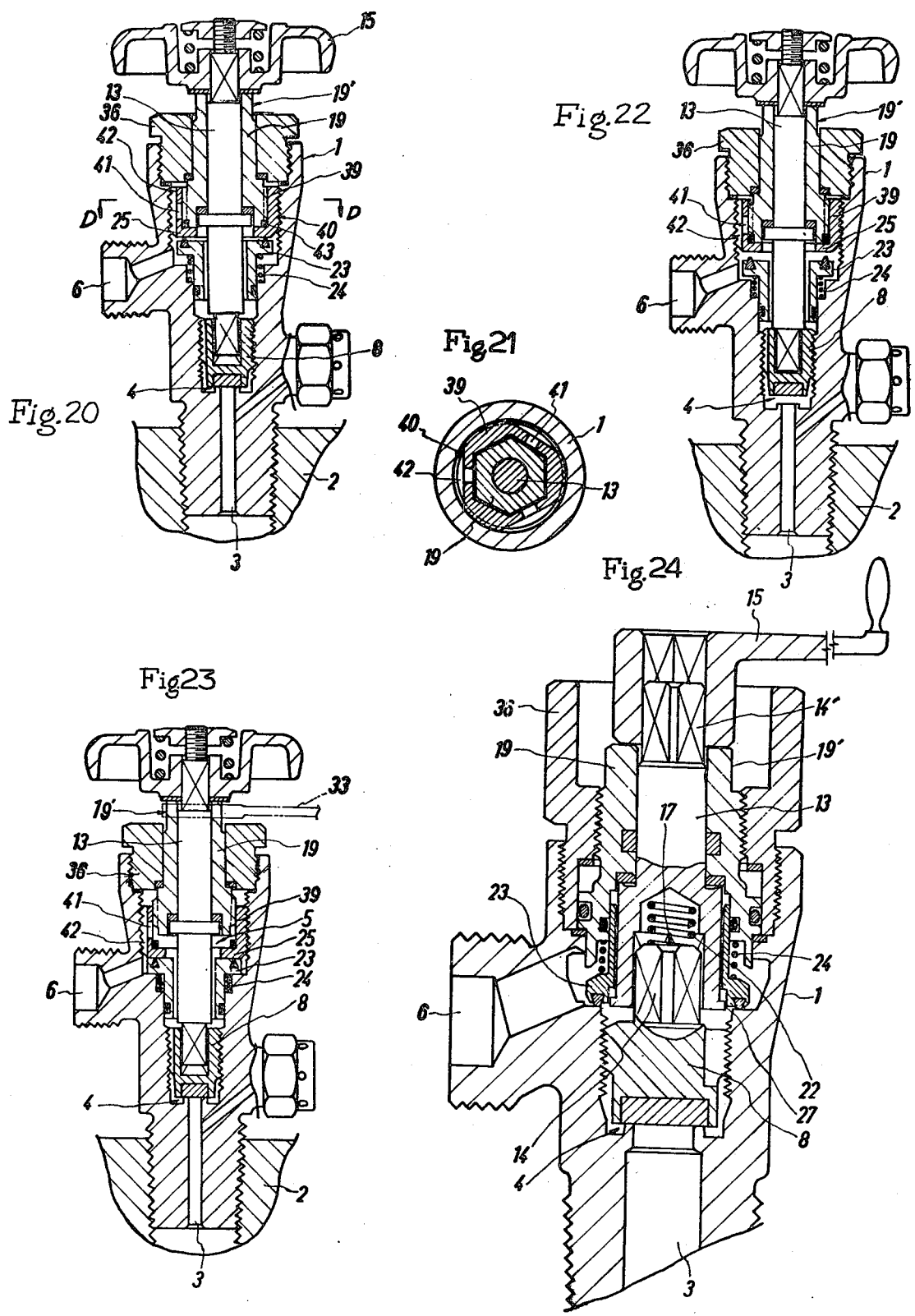

HAND-OPERABLE TAKEOUT VALVE FOR A FLUID PRESSURIZED CONTAINER

This invention relates to a hand-operable takeout valve for temporary attachment to a fluid pressurized container, such as a gas cylinder, and more particularly to a hand-operable takeout valve including a check valve which can be made inoperable where desired, such as when the container is filled or sucked.

In general a takeout valve of this type is so constructed that the check valve is opened under the fluid pressure, thereby enabling the fluid to pass, whereas when the pressure decreases below a required value the check valve is restored to block the flow of fluid. In addition the check valve is so designed that it can be kept opened when the container is filled up or the remaining fluid therein is drawn out under a vacuum, so as to allow the fluid to pass therethrough freely. Under the conventional systems the check valve is provided in the takeout passage, and its size and dimension are restricted by those of the takeout passage, which leads to many difficulties in design. A further problem is that the check valve is located at such an accessible place that it is subject to unnecessary examination by an operator, which results in troubles or malfunction.

With this background the present invention is specifically concerned with improvements in the hand-operable takeout valve, and has for its object to provide an improved hand-operable takeout valve including a check valve provided inside the main body.

The invention will be more particularly described by way of example with reference to the drawings, in which:

FIGS. 14 to 17 are cross-sectional views of a ninth modification to the present invention, wherein FIG. 15 is a cross-section taken along the line B—B in FIG. 14;

FIGS. 20 to 23 are cross-sectional views of an eleventh modification to the present invention, wherein FIG. 21 is a cross-section taken along the line D—D in FIG. 20;

FIG. 24 is a cross-sectional view of a twelfth modification to the present invention.

EXAMPLE 1

Figure 1:
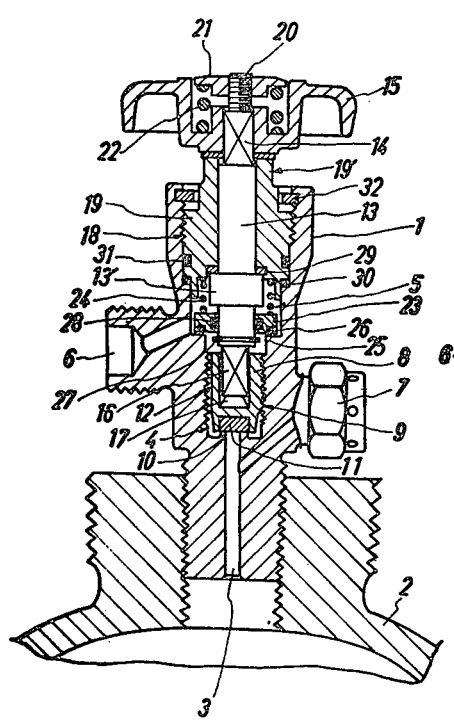
FIGS. 1 to 3 are cross-sectional views of a takeout valve according to the present invention.
Figure 2:
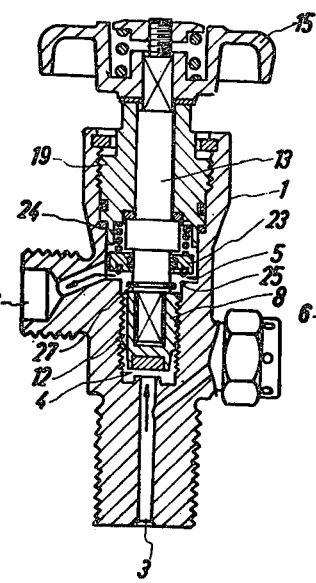
Figure 3:
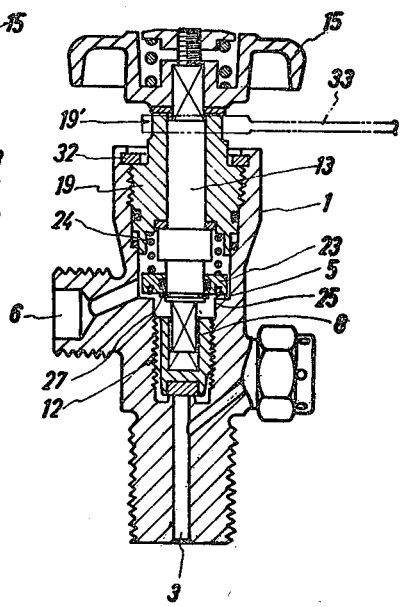

Referring to FIGS. 1 to 3 a first modified version of the present invention will be described, in which FIG. 1 shows that the valve is closed; FIG. 2 shows that the check valve is opened; and FIG. 3 shows that the valve is opened with the opened check valve.

The valve body 1 is attached to a fluid pressurized container 2, such as a gas cylinder, with a passage 3 communicating with the inside of the container. The passage 3 communicates with a first chamber 4 in which a hand-operable valve 8 is movably accommodated, and additionally with a second chamber 5 in which a check valve 23 is movably accommodated, the second chamber including a takeout opening or port 6. The passage 3 includes a suitable vent communicating with a safety valve 7.

The hand-operable valve 8 is provided with threads 9 so as to engage with the mating threads on the inside surface of the chamber 4, thereby enabling the same to rise or lower when the stem 13 of the valve 8 is rotated by means of a handwheel 15. The valve 8 is provided with sealing 11, the sealing being engageable with the valve seat 10 produced at the entrance of the passage 3, and additionally it is provided with flat band-shaped surfaces around its periphery so as to form passages 12 connecting between the passage 3 and the valve chamber 5.

The stem 13 passes through the chambers 4 and 5, with the handwheel 15 capped on its upper shank portion 14. The lower shank portion 16 is slidably fitted in the alot 17 in the valve 8, wherein it is preferred that the lower shank portion and the slot have a similar polyhedral shape, such as a hexahedral shape. The upper portion of the stem 13 is accepted in a sleeve 19 screwed in the valve body 1; reference numeral 18 generally indicates the threads on both sides. In the sleeve 19 the stem 13 can be rotated and moved vertically. The stem 13 is provided with a threaded portion 20 at its top end in which an abutment plate 21 is fitted so as to keep a coiled spring 22 in a space extending to the handwheel 15. Thus the stem 13 is subjected to upward urge under the action of the compression spring 22, but the upward movement thereof is restricted by a bulged portion of the stem 13' which comes into abutment with the sleeve 19 through sealing 29.

The stem 13 passes through the check valve 23 such that the check valve can freely move along the stem against a spring 24, which is intended to urge the valve 23 downwardly. Thus the check valve 23 is normally placed into engagement with the valve seat 25 through a sealing 26. The upward movement of the check valve 23 against the compression spring 24 is effected by the flange 27 fitted around the stem 13 when the stem is raised. The stem 13 and the check valve 23 are kept liquid-tight by the use of an O-ring 28. The valve body 1 and the sleeve 19 are kept liquid-tight by sealing 30 and an O-ring 31. The upward displacement of the sleeve 19 is blocked by a stop 32. The sleeve 19 is provided with a handling portion 19' in its upper part so as to effect its rotation, wherein the handling portion prefereably has a polygonal shape.

A typical operation of the hand-operable valve will be described:

As illustrated in FIG. 1 the valve 8 is lowered so as to come into engagement with the valve seat 10, thereby closing the passage 3 to block the flow of fluid from the container 2. In this case the sleeve 19 is located at its lowest place, with the flange 27 being situated below the valve seat 25.

The handwheel 15 is rotated in the "opening" direction, thereby causing the valve 8 to rise up the threads 9 to open the passage 3. As illustrated in FIG. 2 the pressurized fluid is enabled to enter the chamber 4 by way of the passages 3 and 12, and then advance into the chamber 5 while forcing the check valve 23 backwardly aginst the compression spring 24. In this way the fluid reaches the takeout port 6.

As the fluid in the container 2 is discharged the internal pressure decreases, and finally comes below the strength of the spring 24. This enables the check valve 23 to restore its original position annd settle on the seat 25. At this stage the internal pressure to fluid in the container becomes equal to the strength of the compression spring 24.

When the container 2 is charged up or the remaining content therein is drawn off under a vacuum, the sleeve 19 is rotated by a wrench 33 or other similar tool which is engaged with the handling portion 19' of the sleeve, so as to enable the same to rise up the threads 18. Thus the stem 13 is raised until the flange 27 is positioned above the valve seat 25, thereby causing the check valve 23 to separate from the valve seat 25. In this way the communication between the chambers 4 and 5 is effected. At this stage the handwheel 15 is rotated in the opening direction, thereby permitting a fluid to flow in or out through the passage 3. When the passage 3 is to be closed the reverse precedure will be taken.

EXAMPLE 2

Figure 4:
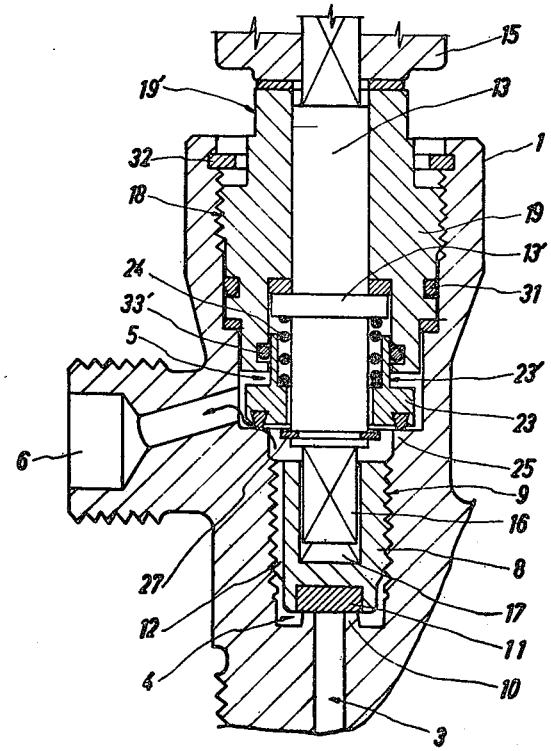
FIG. 4 is a cross-sectional view of a second modification to the present invention.

Referring to FIG. 4, in which a modified valve 1 is illustrated, the check valve 23 is provided with a sleeve portion 23', which is kept liquid-tight with the sleeve 19 by the use of an O-ring 33' instead of using the O-ring 28 in FIGS. 1 to 3.

In this embodiment the wearing of the O-ringn 33' can be avoided with no angular friction involved in rotating the stem 13 by means of the handwheel 15. This is advantageous over the first embodimenet.

EXAMPLE 3

Figure 5:
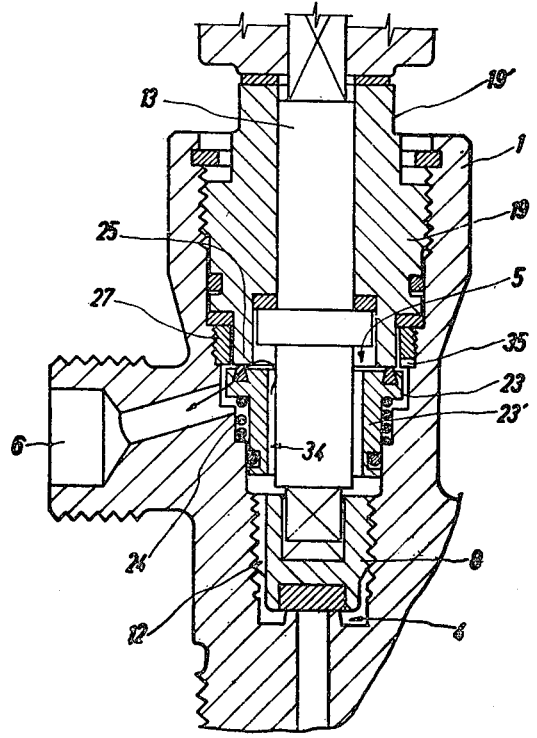
FIG. 5 is a cross-sectional view of a third modification to the present invention.

As illustrated in FIG. 5 the check valve 23 is subjected to upward urge under the action of the compression spring 24, and the valve seat 25 is given by the sleeve 19 in the form of a protrusion. In addition the stop means 27 against the check valve 23 is given in the form of a projecting ring fitted in the valve body 1.

Under this arrangement, when the hand-operable valve 8 is opened in the described manner the fluid is allowed to rise up a passage 34 formed between the check valve 23 and the stem 13 and reach above the check valve, thereby forcing the same downwardly against the spring 24. Thus the fluid is permitted to flow into the takeout port 6. When the check valve 23 is to be forced into opening, the sleeve 19 is raised, thereby causing the valve seat 25 to withdraw from the stop means 27. During the withdrawal the valve 23 is kept in abutment with the stop means 27. On the other hand the stop means 27 is provided with broken parts 35 in its periphery. As a result the passage 34 is enabled to communicate with the takeout port 6 through the broken parts 35 in the stop means 27. In this situation the hand-operable valve 8 is opened in the described manner.

EXAMPLE 4

Figure 6:
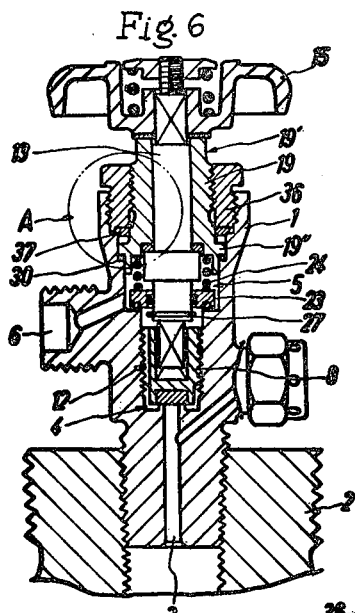
FIG. 6 is a cross-sectional view of a fourth modification to the present invention.

Referring to FIG. 6 there is provided an intermediate nut 36 between the sleeve 19 and the valve body 1, and additionally the sleeve 19 is provided with a flange portion 19''. Between the flange portion 19'' and the nut 36 there is provided a ring-shaped sealing 37, which limits the upward movement of the sleeve 19. The procedure of operation is the same as in Example 1. In this embodiment when the sleeve 19 keeps contact either with the sealing 30 or 37 there is no risk of fluid leakage therethrough; however when the sleeve 19 is in the middle thereof there is a possibility of leaking. The arrangement illustrated in FIG. 7 is a preferred embodiment for solving this problem.

Figure 7:
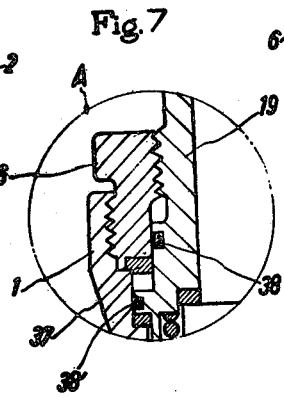
FIG. 7 is a cross-sectional view on an enlarged scale of the portion indicated by A in FIG. 6 to show a further modification thereto.

As illustrated in FIG. 7 it is preferred that O-rings 38 and/or 38' are provided in between the sleeve 19 and the valve body 1, and in between the sleeve 19 and the nut 36.

EXAMPLE 5

Figure 8:
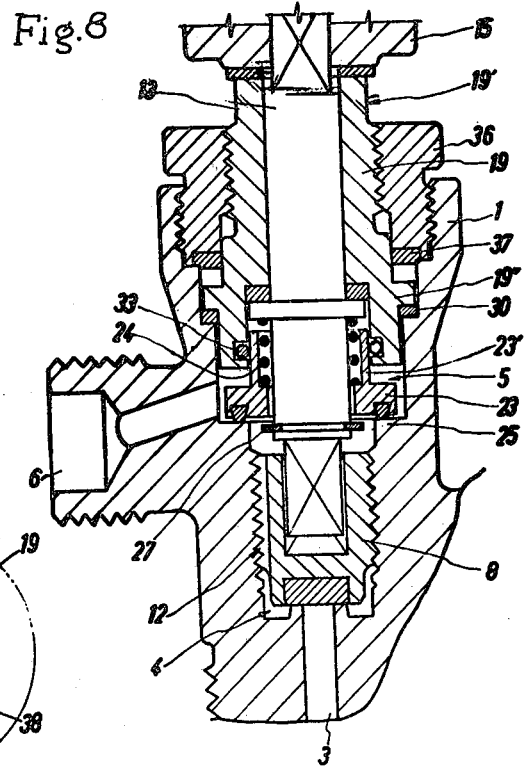
FIG. 8 is a cross-sectional view of a fifth modification to the present invention.

FIG. 8 illustrates this embodiment, which has, in combination, the structures of the check valve 23 in Example 2 and the sleeve 19 in Example 4. Preferably the O-rings illustrated in FIG. 7 can be added to this embodiment.

EXAMPLE 6

Figure 9:
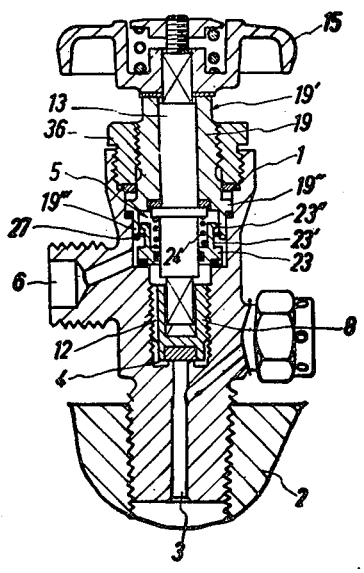
FIG. 9 is a cross-sectional view of a sixth modification to the present invention.

This embodiment, illustrated in FIG. 9, is a modified version of Example 4 illustrated in FIG. 6, in which the stop means 27 is provided in the lower extension 19''' of the sleeve 19 instead of in the stem 13, with a mating ring-shaped flange 23'' provided in a projection 23' of the check valve 23. The check valve 23 is prevented from its further downward movement when the ring-shaped flange 23'' engages the stop means 27. Under this arrangement when the sleeve 19 is raised it is followed by the opening of the check valve.

EXAMPLE 7

Figure 10:
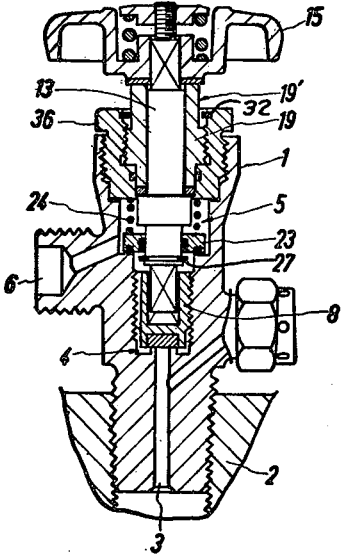
FIG. 10 is a cross-sectional view of a seventh modification to the present invention.

FIG. 10 illustrates this embodiment, which is a modified version of Example 1 with a difference that the sleeve 19 is accepted in a nut 36. The upward movement of the sleeve 19 is limited by the stop means 32.

EXAMPLE 8

Figure 11:
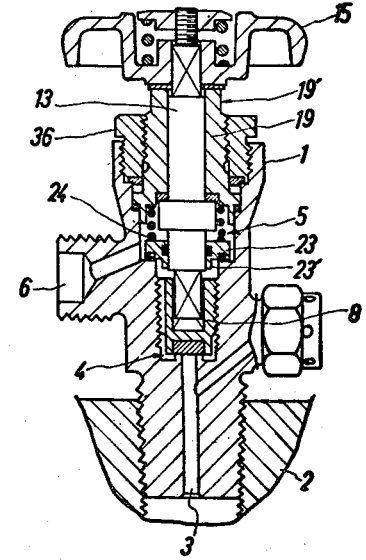
FIGS. 11 to 13 are cross-sectional views of a eighth modification to the present invention
Figure 12:
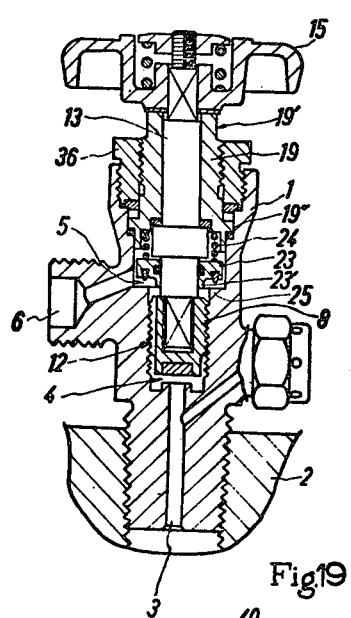
Figure 13:
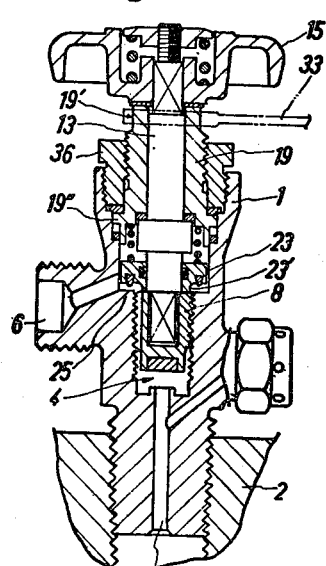

FIGS. 11 to 13 illustrate this embodiment, which is a modified version of Example 4 (FIG. 6) with a difference that the stop means 27 is omitted with the replacement of a sleeve 23', which is directed towards the valve 8.

Under this arrangement when the hand-operable valve 8 is opened, thereby permitting the fluid to pass therethrough, the check valve 23 is forced to open with respect to the takeout port 6 as illustrated in FIG. 12. When the check valve 23 is to be forcedly opened, the first step is to raise the sleeve 19 in the described manner, and the second step is to raise the valve 8, in the course of which the valve 8 comes into abutment with the downwardly-directed sleeve 23' of check valve, thereby pushing the same upwardly. In this way the check valve 23 is forcedly opened with respect to the takeout port 6. In this embodiment, it is evident that so long as the valve 8 is closed it is no longer possible to open the check valve 23.

EXAMPLE 9

Figure 14:
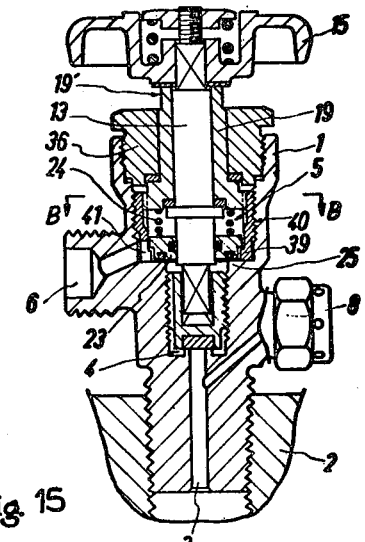
Figure 15:
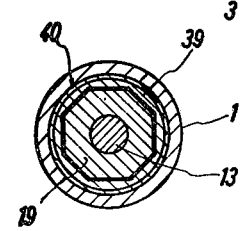

FIGS. 14 and 15 illustrate this embodiment, in which the sleeve 19 is received in the nut 36 for rotational displacement, not in a thread relationship but a facial relationship. Between the sleeve and the valve body 1 there is provided a further nut 39, in which the lower portion of the sleeve 19 is received for rotational displacement The second nut 39 is secured by means of threads 40 in the valve body 1. The second nut 39 includes a shoulder to engage with the check valve 23 so as to ensure their associated movement, and additionally is provided with broken parts 41 so as to enable the chamber 5 to communicate with the takeout port 6.

Figure 16:
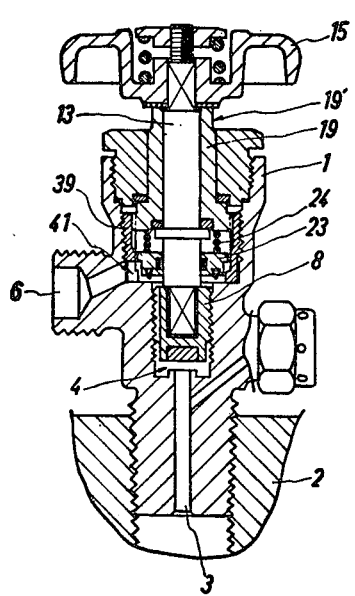
Figure 17:
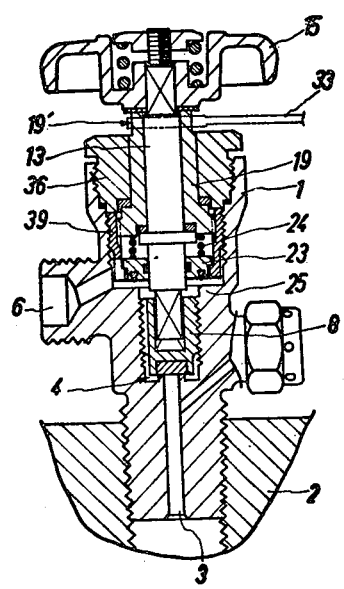

Under this arrangement when the valve 8 is closed the lower nut 39 is situated at its lowest position, in which the check valve 23 is kept in abutment with the valve seat 25 under the action of the spring 24. When the valve 8 is opened the check valve 23 is forced to withdraw under the pressure of fluid introduced into the chamber, thereby enabling the chamber 5 to communicate with the takeout port 6 through the broken parts 41 in the lower parts of the nut 39 as illustrated in FIG. 16. When the check valve is to be forcedly raised the sleeve 19 is firstly raised in the described manner and then the lower nut 39 is raised as illustrated in FIG. 17, thereby enabling the check valve 23 to follow the upward movement thereof.

EXAMPLE 10

Figure 19:
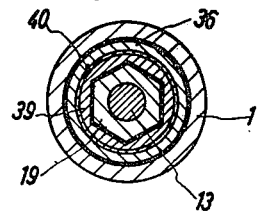
FIG. 19 is a cross-sectional view of the valve illustrated in FIG. 18, taken along the line C—C therein.
Figure 18:
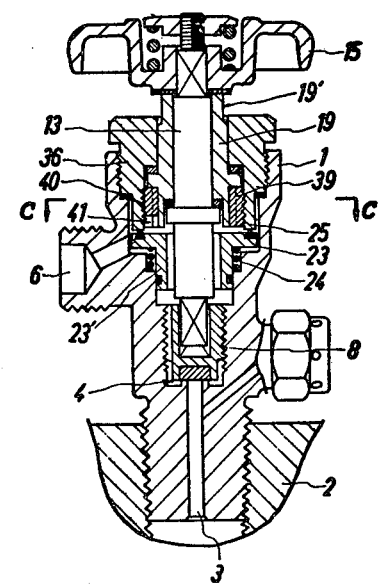
FIG. 18 is a cross-sectional view of a tenth modification to the present invention.

FIGS. 18 and 19 illustrate this embodiment, in which the check valve 23 is subjected to upward urge under the action of the spring 24, and normally the check valve 23 is placed in abutment with the valve seat 25 produced in the end face of the nut 36. Thus when the lower nut 39 is lowered the check valve 23 is forced down, thereby enabling the chamber 5 to communicate with the takeout port 6.

EXAMPLE 11

FIGS. 20 to 23 illustrate this embodiment, in which the nut 39 is secured in the valve body 1 through the threads 40, with passages 42 interposed therebetween. In addition the nut 39 is provided with an O-ring 43 in its lower part serving as a valve seat 25 for the check valve 23.

under this arrangement when the fluid is introduced into the chamber 5 the check valve 23 is forced down under the fluid pressure and separated from the valve seat 25 as illustrated in FIG. 22. When the check valve 23 is to be forcedly opened, the nut 39 is lowered while pushing down the check valve 23 as illustrated in FIG. 23, thereby enabling the chamber 5 to communicate with the takeout port 6 through the broken parts 41 and the passages 42.

EXAMPLE 12

FIG. 24 illustrates this embodiment, in which the hand-operable valve 8 is provided with a polyhedral projection 14 directed to the check valve 23, and in the stem 13 there is provided a bore 17 for receiving the polyhedral projection. Between the stem 13 and the valve 8 there is provided a spring 22 urging the stem in the upward direction. This embodiment is substantially the same as Example 4 (FIG. 6). The stem 13 is rotated by means of a tool 15, such as a wrench, which is applied on the end portion 14' of the stem.

As evident from the foregoing, according to the present invention the check valve can be manually controlled, apart from its operation under a fluid pressure, for co-working with the operation of the hand-operable main valve. In addition, the check valve is housed within the main body, thereby protecting the same againsnt a possible unnecessary inspection, which results in a prolonged life and reliability.

What is claimed is:

1. A hand-operable takeout valve for temporary attachement to a fluid pressurized container, comprising an outer body attachable to said container, said outer body including a fluid passage communicating with a takeout port via two adjacent chambers, said first chamber including a main valve closable of said fluid passage and said second chamber including a check valve closable of said takeout port, a stem supporting said main valve for rotational displacement, said stem passing through said check valve and being provided with a means for urging said check valve upwardly, a sleeve mounted in said outer body for rotational displacement, a spring means interposed between said sleeve and said check valve so as to maintain said check valve at a location in which to close said takeout port, and a rotating means of said stem for effecting the rotational displacement of said main valve with respect to said fluid passage.

2. A hand-operable takeout valve as claimed in claim 1, wherein the stem has polyhedral shank portions at either end and wherein the main valve and the rotating means have corresponding polyhedral portions, thereby effecting the transmission of an applied torque therebetween.

3. A hand-operable takeout valve as claimed in claim 1, wherein a sealing means is provided in between the sleeve and the check valve by providing a ring-shaped projection in said check valve, said ring-shaped projection housing said spring placed between said sleeve and check valve.

4. A hand-operable takeout valve as claimed in claim 1, wherein the spring is provided between the check valve and the outer body so as to place said check valve under the upward urge of said spring.

5. A hand-operable takeout valve as claimed in claim 1, wherein between the sleeve and the outer body there is provided an intermediate nut for rotational displacement, said sleeve being received in said nut in a free facial relationship, said intermediate nut including a shoulder engaging with said check valve so as to ensure an associated movement thereof.

6. A takeout valve for attachment to a fluid pressurized container, said valve comprising:
an outer body attachable to said container, said outer body including: a fluid passage, a first chamber, a second chamber, and a takeout port; said fluid passage communicating with said first chamber, said first chamber communicating with said second chamber, said second chamber communicating with said takeout port;
a main valve located in said first chamber;
a check valve and valve seat located in said second chamber;
a sleeve rotatably mounted in said outer body for axial displacement with respect to said outer body;
a stem, rotatably mounted in said sleeve, passing through said check valve and engaging said main valve, to rotate and displace said main valve with respect to said outer body to control the passage of fluid between said fluid passage and said first chamber;

a biasing means urging said check valve against said valve seat for preventing the passage of fluid between said second chamber and said takeout port;

a holding means urging said check valve away from said valve seat when said sleeve is axially displaced for allowing the passage of fluid between said second chamber and said takeout port.

7. A takeout valve as claimed in claim 6 wherein said holding means is a flange fitted around the stem and the valve seat is formed in the outer body.

8. A takeout valve as claimed in claim 7 wherein said biasing means is a spring compressed between the check valve and the sleeve.

9. A takeout valve as claimed in claim 7 wherein said bias means is a spring compressed between the check valve and a bulged portion of the stem.

10. A takeout valve as claimed in claim 7 further including a nut rotatably mounted for axial displacement between the sleeve and the outer body, wherein said biasing means is a spring compressed between the check valve and the nut.

11. A takeout valve as claimed in claim 6 wherein said holding means is a projection of the sleeve and the valve seat is formed in the outer body.

12. A takeout valve as claimed in claim 11 wherein said biasing means is a spring compressed between the check valve and a bulged portion of the stem.

13. A takeout valve as claimed in claim 6 wherein said holding means is a projection of the main valve and the valve seat is formed in the outer body.

14. A takeout valve as claimed in claim 13 wherein the biasing means is a spring compressed between the check valve and the sleeve.

15. A takeout valve as claimed in claim 6 further including a nut rotatably mounted for axial displacement between the sleeve and the outer body, wherein the holding means is a shoulder of said nut and the valve seat is formed in the outer body.

16. A takeout valve as claimed in claim 15 wherein the biasing means is a spring compressed between the check valve and the sleeve.

17. A takeout valve as claimed in claim 6 wherein the holding means is a stop fitted into the outer body and the valve seat is formed in the sleeve.

18. A takeout valve as claimed in claim 17 wherein the biasing means is a spring compressed between the check valve and the outer body.

19. A takeout valve as claimed in claim 6 further including a first nut rotatably mounted for axial displacement between the sleeve and the outer body and wherein said holding means is a second nut rotatably mounted for axial displacement between the sleeve and said first nut and the valve seat is formed in said first nut.

20. A takeout valve as claimed in claim 19 wherein the biasing means is a spring compressed beteen the check valve and the outer body.

21. A takeout valve as claimed in claim 6 wherein the holding means is a nut rotatably mounted for axial displacement between the sleeve and the outer body, and the valve seat is formed in said nut, said nut additionally having an aperture enabling communication between the second chamber and the takeout port when said nut and said check valve are axially displaced against the urging of the biasing means.

22. A takeout valve as claimed in claim 21 wherein the biasing means is a spring compressed between the check vave and the outer body.

23. A takeout valve as claimed in claim 6 wherein the biasing means is a spring compressed between the check valve and the sleeve.

24. A takeout valve as claimed in claim 6 wherein the biasing means is a spring compressed between the check valve and a bulged portion of the stem.

25. A takeout valve as claimed in claim 6 wherein the biasing means is a spring compressed between the check valve and the outer body.

26. A takeout valve as claimed in claim 6 further including a nut rotatably mounted for axial displacement between the sleeve and the outer body wherein said biasing means is a spring compressed between the check valve and the nut.

27. A takeout valve as claimed in claim 6 wherein the stem is received within the main valve.

28. A takeout valve as claimed in claim 6 wherein the main valve is received within the stem.

* * * * *